United States Patent [19]

Louagie et al.

[11] Patent Number: 5,787,120
[45] Date of Patent: Jul. 28, 1998

[54] TRANSMISSION METHOD AND TRANSMITTER FOR SIGNALS WITH A DECOUPLED LOW LEVEL AND AT LEAST ONE COUPLED HIGH LEVEL FOR A TELECOMMUNICATION NETWORK INCLUDING SUCH A TRANSMITTER

[75] Inventors: Filip Marcel Louagie, Antwerp; Didier René Haspeslagh, Harelbeke, both of Belgium

[73] Assignee: Alcatel N.V., Rijswijk, Netherlands

[21] Appl. No.: 590,338

[22] Filed: Jan. 23, 1996

[30] Foreign Application Priority Data

Jan. 30, 1995 [EP] European Pat. Off. ............ 9520017

[51] Int. Cl.⁶ .................... H04B 3/00; H04L 25/00
[52] U.S. Cl. ............................ 375/257; 375/258
[58] Field of Search ............................ 375/257, 258; 178/62.2, 69 K

[56] References Cited

U.S. PATENT DOCUMENTS

| | | | |
|---|---|---|---|
| 1,937,640 | 12/1933 | Clarke | 178/66 |
| 2,221,136 | 11/1940 | Harms | 178/68 |
| 4,121,118 | 10/1978 | Miyazaki . | |
| 4,388,725 | 6/1983 | Saito et al. | 375/36 |
| 4,620,310 | 10/1986 | Lvovsky et al. | 375/17 |
| 4,713,827 | 12/1987 | Lauffer et al. | 375/7 |
| 4,797,904 | 1/1989 | Dekker et al. | 375/60 |
| 4,805,214 | 2/1989 | Fensch et al. | 379/399 |
| 5,243,623 | 9/1993 | Murdock | 375/7 |
| 5,384,808 | 1/1995 | Van Brunt et al. | 375/36 |
| 5,396,512 | 3/1995 | Crabb et al. | 375/257 |
| 5,513,218 | 4/1996 | Moller | 375/257 |
| 5,546,419 | 8/1996 | Zierhut | 375/257 |
| 5,587,824 | 12/1996 | Asprey | 359/154 |
| 5,654,981 | 8/1997 | Mahant-Shetti et al. | 375/219 |

FOREIGN PATENT DOCUMENTS

| | | |
|---|---|---|
| 0247675 | 12/1987 | European Pat. Off. . |
| 0272171 | 6/1988 | European Pat. Off. . |
| 0428975 | 5/1991 | European Pat. Off. . |

OTHER PUBLICATIONS

ITU-T Recommendation 1.430, Basic User-Network Interface—Layer 1 Specification, (Mar. 1993), pp. 29–32, 10, 35–39.

Primary Examiner—Stephen Chin
Assistant Examiner—Mohammad Ghayour
Attorney, Agent, or Firm—Ware, Fessola, Van Der Sluys & Adolphson LLP

[57] ABSTRACT

To go from a coupled high level to a decoupled low level, a source unit (SU) of a transmitter (T) must be decoupled from a transmission line (TL) by a impedance unit (IU). As a result, oscillatory transition phenomena appear in the output signal and this signal possibly goes beyond a prescribed template. To avoid such overshoot problems the present transmitter (T) decreases the signal level during a decrease period before decoupling the source unit (SU) from the transmission line (TL). Therefore a source control circuit (SCC) is included in the control unit (CU) of the transmitter (T) for controlling the source level in such a way that the output signal level is decreasing.

8 Claims, 10 Drawing Sheets

TRANSMISSION METHOD AND TRANSMITTER FOR SIGNALS WITH A DECOUPLED LOW LEVEL AND AT LEAST ONE COUPLED HIGH LEVEL FOR A TELECOMMUNICATION NETWORK INCLUDING SUCH A TRANSMITTER

TECHNICAL FIELD

The present invention relates to a transmission method, to a transmitter, and to an interface circuit and a system component for a telecommunication network.

BACKGROUND OF THE INVENTION

Such a transmission method and such a transmitter performing this method are already known in the art, e.g. from the U.S. Pat. No. 4,805,214, wherein the impedance unit comprises four output transistors and wherein the impedance control circuit includes four differential amplifiers, each of them controlling one of the four output transistors in such a way that the output signals comprise a low level and a high level with possibly a positive or a negative polarity. This transmitter raises difficulties in controlling overvoltages and undervoltages when the signal to be transmitted transits from a high level with either a positive or a negative polarity to the low level. Indeed, such a transition is performed by switching off abruptly the four output transistors, as a result of which the transmitter becomes decoupled from the transmission line. Due to the presence of a transformer between the transmitter and the transmission line, oscillatory transition phenomena appear in the output signal. Although the differential amplifiers of this transmitter receive feedback, overvoltages and undervoltages cannot be avoided, but as said in the above mentioned patent specification, are maintained within acceptable limits.

DISCLOSURE OF THE INVENTION

An object of the present invention is to provide a transmitter of the above known type, but wherein, when going from a high level to the low level, the output signal is kept strictly within a prescribed template and thus over- and undervoltages are avoided.

According to a first aspect of the present invention, a method for transmission of a signal with a low level and at least one high level, generated by a transmitter and transmitted on a transmission line which couples said transmitter to a receiver, wherein said transmitter is decoupled from said transmission line during a time said signal is at said low level, and said transmitter is coupled to said transmission line during a time said signal level is at said high level, is characterized in that to transit said signal from said high level to said low level, said transmitter is decoupled from said transmission line only after said signal is decreased to said low level.

According to a second aspect of the present invention, a transmitter for providing a signal with a low level and at least one high level and for providing said signal to a transmission line for coupling said transmitter to a receiver, said transmitter including a source unit for providing a source level at a source unit output, an impedance unit having an impedance unit input coupled to said source unit output and having an impedance unit output which is coupled to said transmission line for coupling and decoupling said source unit to and from said transmission line respectively, and a control unit including an impedance control circuit, provided for controlling said impedance unit so that during a time said signal is at said low level, said source unit is decoupled from said transmission line by said impedance unit and during a time said signal is at said high level, said source unit is coupled to said transmission line via said impedance unit, is characterized in that said control unit also includes a source control circuit, provided to control said source unit so that, to transit said signal from said high level to said low level, said source level is decreased during a decrease period after which said source unit is decoupled from said transmission line.

According to a third aspect of the present invention, an interface circuit provided for transmitting and receiving signals respectively to and from a subscriber line comprising a receive bus and a transmit bus, said interface circuit including a receive part comprising a receiver having a first output connected to a receive buffer for temporarily storing received data signals and providing said received data signals to an interface output, said receiver having a second output connected to a signal recovery unit, for recovering a bit clock signal and a frame clock signal from said received data signal, said interface circuit also including a transmit part comprising a transmit buffer for temporarily storing transmit data signals provided to said interface circuit via an interface input, and a transmitter for providing a signal and including a source unit for providing a source level at a source unit output, an interface unit, connected to said source unit output for coupling and decoupling said source unit to and from said transmit bus respectively, and a control unit having a control unit input coupled to output signals of said transmit buffer, said control unit including an impedance control circuit for controlling said impedance unit in such a way that during a time said signal is at a low level, said source unit is decoupled form said transmit bus and during a time said signal is at a high level, said source unit is coupled to said transmit bus, said interface circuit further including an operation control unit for controlling said receive buffer, said transmit buffer and said signal recovery unit, is characterized in that said control unit additionally includes a source control circuit for controlling said source unit in such a way that, to transit said signal from said high level to said low level, said source level is decreased during a decrease period after which said source unit is decoupled from said transmit bus.

According to a fourth aspect of the present invention, a system component for a telecommunication network including an interface circuit which comprises a receive part, provided to receive data from a receive bus and to apply said received data to an interface output of said interface circuit, a transmit part for providing to a transmit bus data provided to said interface circuit via an interface input, and an operation control unit, for controlling said receive part and said transmit part, said transmit part including a transmitter comprising a source unit, for providing a source level at a source unit output, an impedance unit, connected to said source unit output for coupling and decoupling said source unit to and from said transmit bus respectively, and a control circuit for controlling said impedance unit during a time a signal level of said data is low to decouple said source unit from said transmit bus and during a time said signal level is high to couple said source unit to said transmit bus, is characterized in that said control unit additionally includes a source control circuit for controlling said source unit to transit said signal level from said high level to said low level, by decreasing said source level during a decrease period after which said source unit is decoupled from said transmit bus.

In this way the signal is decreased to a lower level at the initial moment of transition phenomena. Inductive, capacitive and resistive properties of the non ideal transformer will again give rise to deadening oscillatory transition phenomena when decoupling the transmitter from the transmission line. However, by decreasing the signal level, energy is deprived of the system resulting in a restricted amplitude of the oscillations. When switching off the transistors the output signal can now be kept within a prescribed set of limits, e.g. the template described in the *ITU-T Recommendation I.430* of March 1993, p. 30.

Another characteristic feature of the present transmission method is that the low level is defined as a level below a threshold wherein to transit said signal level from said high level to said low level, said transmitter is decoupled from said transmission line, only after said signal level has reached said threshold value. Thus, different ways to decrease the source level may be used to perform the transmission method according to the present invention. It suffices to delay the switching off of the output transistors with a fixed period with respect to the beginning of the decrease of the source level to have a fixed decrease period. Another way of performing the method might be based on measurement of the signal level in such a way that the output transistors are switched off at the moment the signal level has reached a predefined threshold.

A further characteristic of the present transmitter is that it includes a feedback circuit wherein said transmitter also includes a feedback circuit coupled between said output and said input of said impedance unit, and provided to apply said signal to said impedance unit, thereby enabling to control said signal level during the time said signal level has to be high, additionally to provide a smooth decrease of said signal level during said decrease period. The impedance unit and the feedback circuit are connected to constitute a control loop. In this way the signal that is transmitted or a representative value for this signal depending on the amplification of the feedback circuit, is applied to the impedance unit and can be used to correct the signal level.

An additional characteristic of the present transmitter is that it includes a gain unit, inputs of which are coupled to said source unit output and an output of said feedback circuit respectively, and an output of which is coupled to said impedance unit to apply a differential signal to said impedance unit, said gain unit being provided to enable comparing said source level to said signal level and to provide a gain and bandwidth necessary to control said signal level. This gain unit provides the necessary gain and bandwidth to the control loop and thus determines how fast this control loop is reacting to changes at its inputs. In combination with the feedback circuit, the gain unit might be adapted to compare the source level and signal level. As soon as a difference between both is noticed, a differential signal is applied to the impedance unit which corrects the signal level. Such a feedback control loop guarantees a constant output signal level during the time the signal level has to be high. Furthermore, this feedback circuit and gain unit enable to decrease the signal level in a smooth way during the decrease period. Indeed, by lowering the source level during the decrease period, an artificial difference between the signal level and source level is maintained. The gain and bandwidth of the gain unit will then determine the speed of level decrease.

Yet another characteristic feature of the present invention is the gain control circuit for controlling said gain unit in such a way that said gain, provided by said gain unit, is decreased during the time said source unit is decoupled from said transmission line, thereby avoiding clamping at said output of said gain unit. Indeed, clamping at the output of the gain unit would arise if the gain provided by the gain unit would be high at the moment the output transistors are switched off. Due to the decoupling of the transmitter from the transmission line, a difference between both input signals of the gain unit would appear, which in combination with a high gain would make the output of the gain unit approach the power supply level. As a result, the control loop would loose its speed of response to changes at its input. The gain unit would have to return to an equilibrium state before it would be able to generate differential signals again. To avoid this disadvantage, the gain of the gain unit is made controllable and will be decreased sufficiently from the moment on that the transmitter is decoupled from the transmission line.

Still another characteristic feature of the present transmitter is that it includes an instability compensation unit connected between a first and a second output terminal of said impedance unit and provided to enable said transmitter to drive different loads without instability risks. As is for example described in the *ITU-T Recommendation I.430*, the transmitter must be enabled to drive different loads. The transmitter described in the above mentioned US specification however might cause instability problems when coupled to a high load impedance of e.g. 400 Ohms. As will be described later, a simple instability compensation unit is added to the present transmitter to avoid these instability problems caused by high load impedances.

The above mentioned and other objects and features of the invention will become more apparent and the invention itself will be best understood by referring to the following description of an embodiment taken in conjunction with the accompanying drawings wherein:

BRIEF DESCRIPTION OF THE DRAWING

FIG. 2(a) is a time diagram of an ideal pulse shaped signal while

BEST MODE FOR CARRYING OUT THE INVENTION

Figure 1:
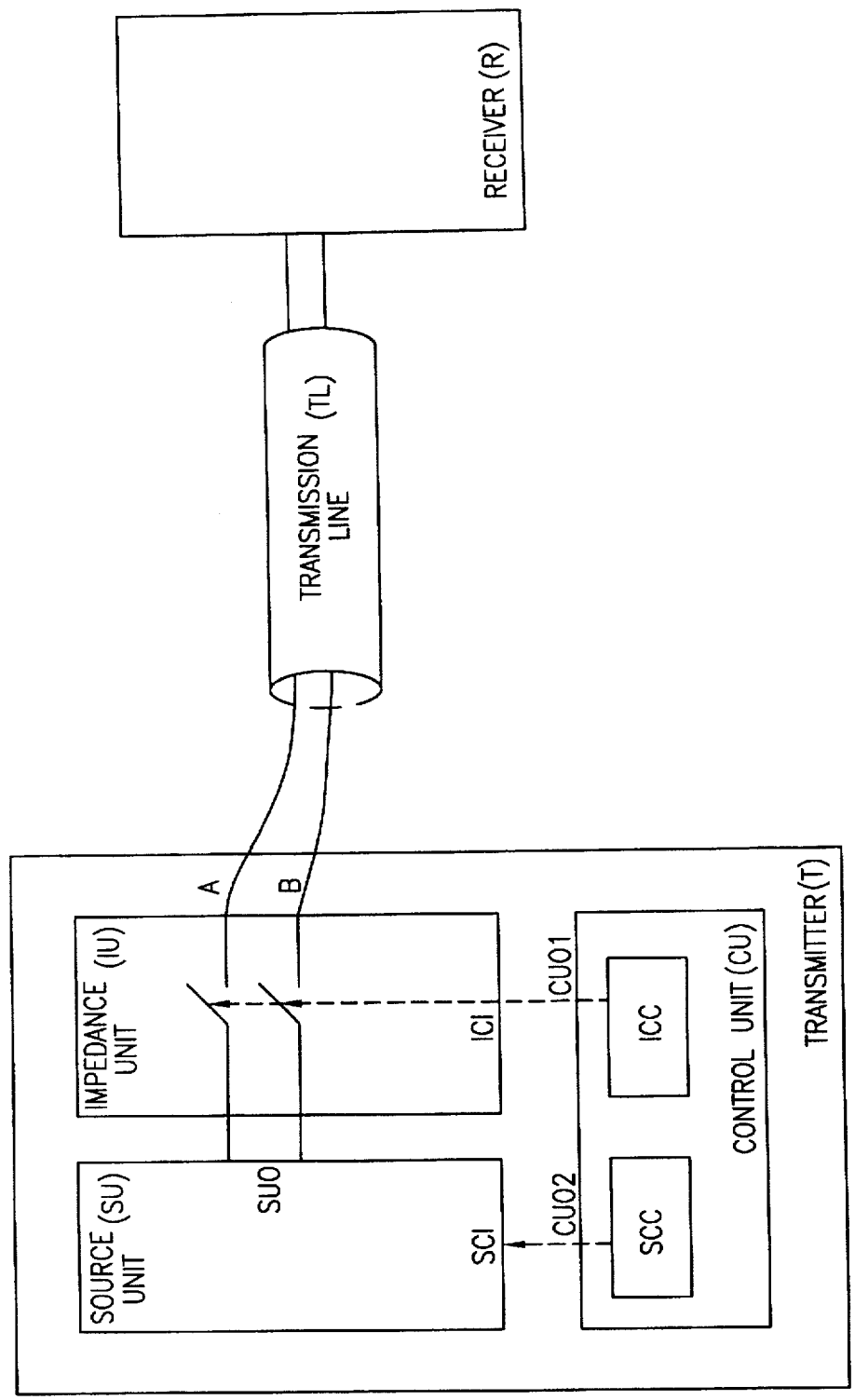
FIG. 1 is a block diagram of an embodiment of a transmitter according to the present invention.

FIG. 1 shows an embodiment of a transmitter T according to the present invention, a transmission line TL and a receiver R.

The transmitter T includes a source unit SU, an impedance unit IU and a control unit CU and is terminated by output terminals A and B. A source control circuit SCC and an impedance control circuit ICC both form part of the control unit CU. The impedance unit IU comprises switching means.

The transmission line TL couples the transmitter T to the receiver R and is therefore connected to the output terminals A and B of the transmitter T.

In the transmitter T, the impedance unit IU is coupled between an output SUO of the source unit SU and the output terminals A and B. A first output CUO1 of the control unit CU, which is in fact an output of the impedance control circuit ICC, is connected to an impedance control input ICI of the impedance unit IU, while a second output CUO2 of the control unit CU, which is in fact an output of the source control circuit SCC, is connected to a source control input SCI of the source unit SU.

The transmitter T of FIG. 1 is able to generate output signals with a low level and at least two high levels, the first of which has a positive polarity and the second of which has a negative polarity, and applies these output signals to the transmission line TL via the output terminals A and B. To generate these output signals, the source unit SU provides a source level at its output SUO and the impedance unit IU, under the control of impedance control signals, is enabled to couple and decouple the source unit output SUO to and from the output terminals A and B, respectively. The impedance control signals applied to the impedance unit IU via its impedance control input ICI, are generated by the impedance control circuit ICC in such a way that during the time the output signal level has to be low, the source unit output SUO is decoupled from the output terminals A and B by the switching means of the impedance unit IU, and during the time the output signal level has to be high, the source unit SU is coupled to the output terminals A and B via the switching means of the impedance unit IU. In this way, the impedance unit IU and more particularly its switching means convert the source level provided by the source unit SU to a pulse shaped output signal. Furthermore, under the control of source control signals generated by the source control circuit SCC and applied to the source unit SU via its source control input SCI, the source level can be controlled. Indeed, when going from one of the high levels to the low level, the source level and correspondingly the output signal level is decreased during a decrease period before the source unit output SUO is decoupled from the transmission line TL. This is necessary because an abrupt transition from one of the high levels to the low level implies the appearance of transition phenomena in the output signal which may exceed a prescribed template. To avoid this overshoot, when going from the negative high level to the low level, or undershoot, when going from the positive high level to the low level, the decoupling is delayed over a decrease period. At the end of the decrease period, the source-unit output SUO is decoupled from the output terminals A and B as a result of which transition phenomena still appear in the output signal. If the transmitter T is coupled to the transmission line TL via a transformer, which is usually the situation, these transition phenomena will be deadening oscillatory phenomena due to the inductive, capacitive and resistive properties of a non ideal transformer. If during the decrease period, the output signal level is decreased significantly, the amplitude of these oscillations can be kept strictly within a prescribed template. Overshoot, when going from the negative high level to the passive low level, and undershoot, when going from the positive high level to the passive low level, will thus be absent in the output signals generated by the present transmitter T.

It is to be noted that the decrease period can be fixed to a constant period. An alternative way however to perform the above described transmission method could be based on a decrease period which is terminated by the moment where the output signal level reaches a predefined threshold value.

Figure 2A:
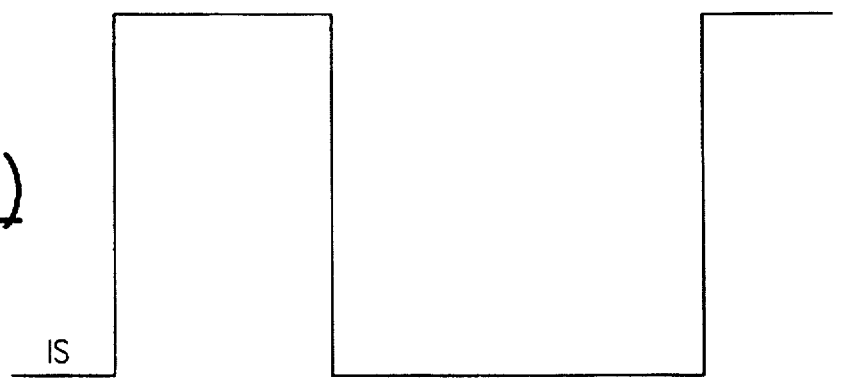
Figure 2B:
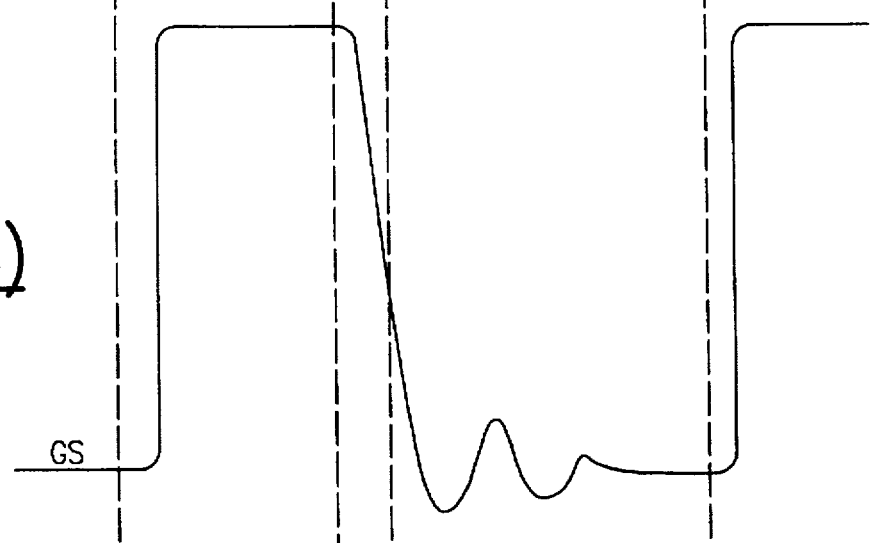
FIG. 2(b) shows the corresponding generated signal according to the present invention.
Figure 2C:
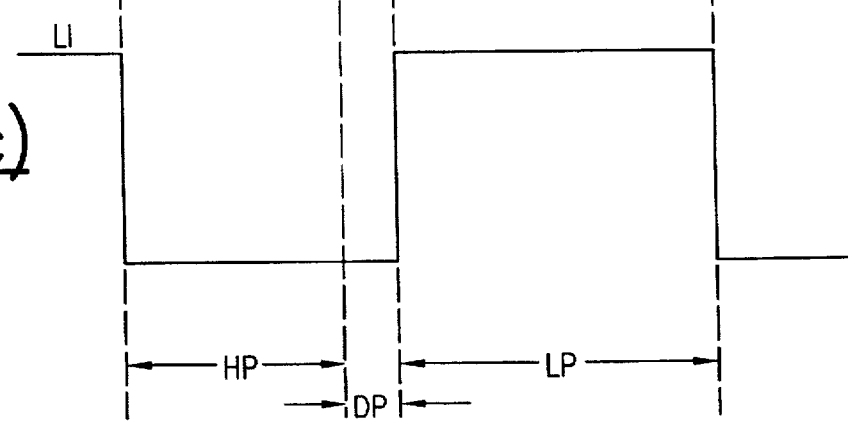
FIG. 2(c) shows a diagram representing the corresponding load impedance of the transmitter according to the present invention.

A clear overview of the successive steps to go from the positive high level to the low level is represented in the time diagrams of FIGS. 2(a), 2(b) and 2(c) which are illustrated with respect to a common timeline. In FIG. 2(a), IS represents an ideal pulse signal whose level has to be high during a first period HP and whose level has to be low during a second period LP. Furthermore a corresponding generated signal GS according to the present invention is drawn in FIG. 2(b). The level of this generated signal GS is decreased during a decrease period DP, whereafter oscillatory transition phenomena arise.

A third diagram shown in FIG. 2(c) illustrates the load impedance LI of the transmitter T in accordance with the generated signal GS: this load impedance LI is low during the first period HP and the decrease period DP because the transmitter T is coupled to the transmission line TL. During the second period LP the load impedance LI of the transmitter T is high because of the decoupling of the transmitter T from the transmission line TL.

Figure 3:
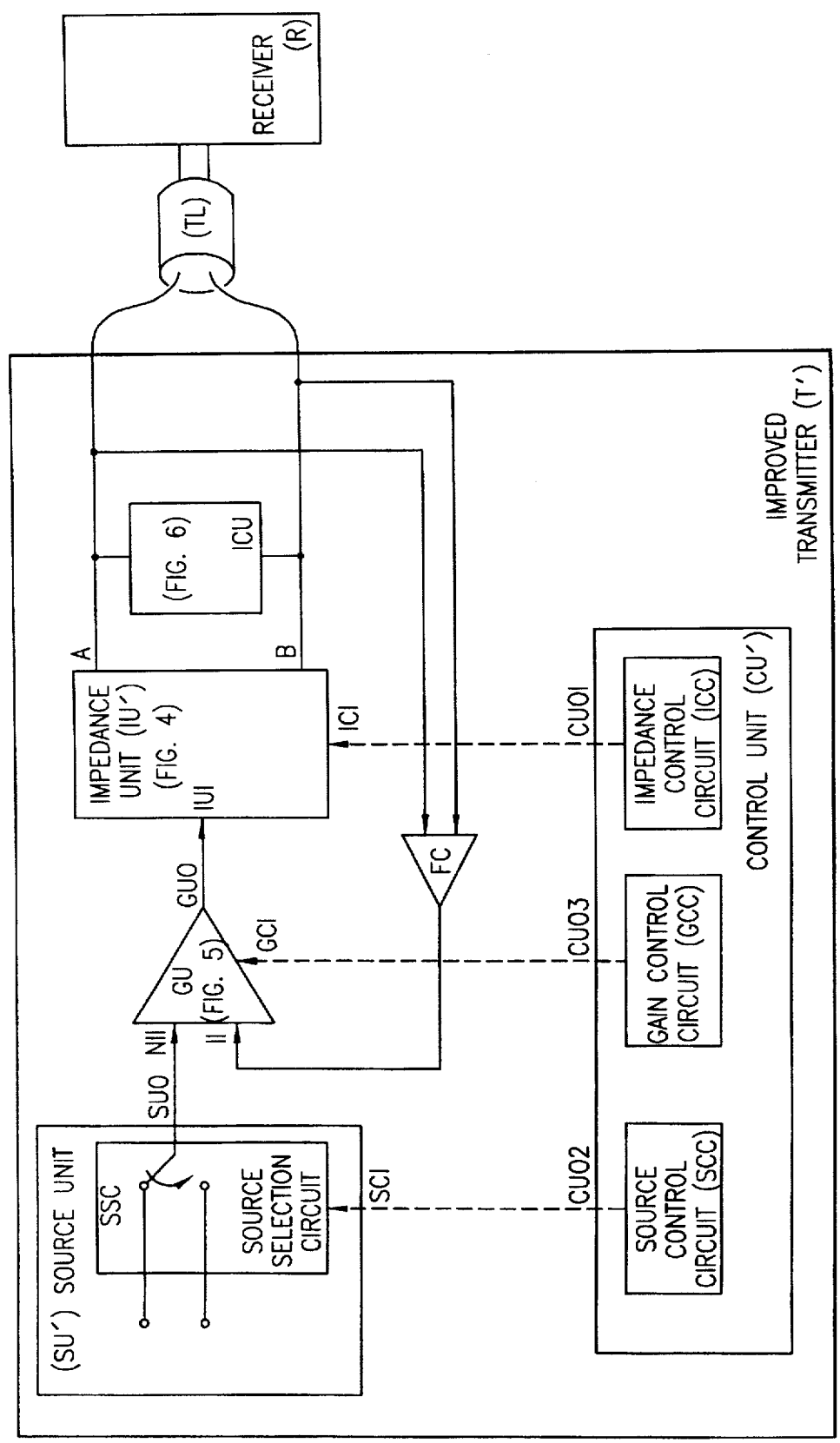
FIG. 3 is a schematic block diagram of an improved embodiment of a transmitter according to the present invention.

An improved embodiment of a transmitter T' according to the present invention is drawn in FIG. 3. This transmitter T' includes a source unit SU', an impedance unit IU' and a control unit CU' which perform approximately the same functions as the source unit SU, the impedance unit IU and the control unit CU of FIG. 1. Furthermore the transmitter T' includes a feedback circuit FC, a gain unit GU and an instability compensation unit ICU. The particular source unit SU' of FIG. 3 includes a source selection circuit SSC and the control unit CU' comprises a gain control circuit GCC in addition to an impedance control circuit ICC and a source control circuit SCC.

An output SUO of the source unit SU' is connected to a first input NII of the gain unit GU, while an output of the feedback circuit FC is connected to a second input II of the gain unit GU. Inputs of the feedback circuit FC are coupled to the output terminals A and B which terminate the transmitter T'. The impedance unit IU' is coupled between an output GUO of the gain unit GU and the output terminals A and B, and finally the instability compensation unit ICU is connected parallel to the transmission line TL between both output terminals A and B.

A first output CUO1 of the control unit CU' is in fact an output of the impedance control circuit ICC and is therefore connected to an impedance control input ICI of the impedance unit IU'. In a similar way, a second output CUO2 of the control unit CU', being an output of the source control circuit SCC, is connected to a source control input SCI of the source unit SU', and a third output CUO3 of the control unit CU', which is an output of the gain control circuit GCC, is connected to a gain control input GCI of the gain unit GU. The source control input SCI of the source unit SU' is in fact an input of the source selection circuit SSC included in this source unit SU'.

In a similar way as in FIG. 1, the source unit SU' provides a source level which is controllable by the source control signals. In the transmitter T' of FIG. 3 however, the source level provided at the source unit output SUO is selected among at least two discrete levels by the source selection circuit SSC. To perform this selection, the source selection circuit SSC is controlled by source control signals applied to the source unit SU' via the source control input SCI.

In the following description, the transmitter T' is considered to be able to generate output signals again with a low level, characterized by a decoupling of the transmitter T' from the transmission line TL, and two high levels, one of which has a positive polarity and a second of which has a negative polarity. Both high levels are characterized by a coupling of the transmitter T' to the transmission line TL. In addition, detailed electronic schemes of an impedance unit IU', a gain unit GU and an instability compensation unit ICU which, when included in the block scheme of FIG. 3, enable the transmitter T' to generate the above described output signals with the low level and the two high levels, will be described later on.

When going from one of the high output signal levels to the low output signal level, the source selection circuit SSC will be controlled in such a way that it selects a second source level value instead of a first source level value to be applied to the source unit output SUO during the decrease period. Afterwards, the source level will return to the first source level value at a moment when the transmitter T' is already decoupled from the transmission line TL. Referring to FIG. 2(b), this moment is lying somewhere in the period LP.

The feedback circuit FC, the gain unit GU and the impedance unit IU' of FIG. 3 constitute a traditional control loop which enables to correct the output signal level whenever this level deviates from a desired value. The gain unit GU therefore compares the output signal level or a representative value therefrom, applied to its second input II, with the source level, applied to its first input NII. As soon as a difference between both levels can be noticed, the gain unit GU applies a differential signal to the impedance unit IU'. As will be described later the impedance unit IU' is enabled to correct the output signal level on the basis of this differential signal in such a way that the difference disappears.

Moreover, the gain unit GU provides the necessary gain and bandwidth to control the output signal level with an acceptable reaction speed to changes at one of the inputs NII and II of the gain unit GU.

When decoupling the transmitter T' from the transmission line TL to go to the low output signal level, the disconnection performed by the impedance unit IU' may cause clamping problems at the output GUO of the gain unit GU. As a result, the control loop loses its reaction speed because it has to return to an equilibrium state to have full disposal of its gain and bandwidth at the moment the transmitter T' is again coupled to the transmission line TL. To avoid this clamping problem, the gain of the gain unit GU is made adaptable under the control of gain control signals generated by the gain control circuit GCC, and applied to the gain unit GU via the gain control input GCI. The gain unit GU is controlled by these gain control signals in such a way that its gain is reduced significantly from the moment on the transmitter T' is decoupled from the transmission line TL. An embodiment of the gain unit GU, providing a controllable gain, will be described in detail later.

Finally, the particular transmitter T' of FIG. 3 is adapted to drive different load impedances which might be necessary as is e.g. described in *ITU-T Recommendation I.430*, wherein the load impedance might change over a range from 50 ohms to 400 ohms. In the known transmitters, high load impedances of about 400 ohms cause instability problems. A simple instability compensation unit ICU is included in the present transmitter to avoid risk of instability. A detailed description of this instability compensation unit ICU will be given later.

Figure 4:
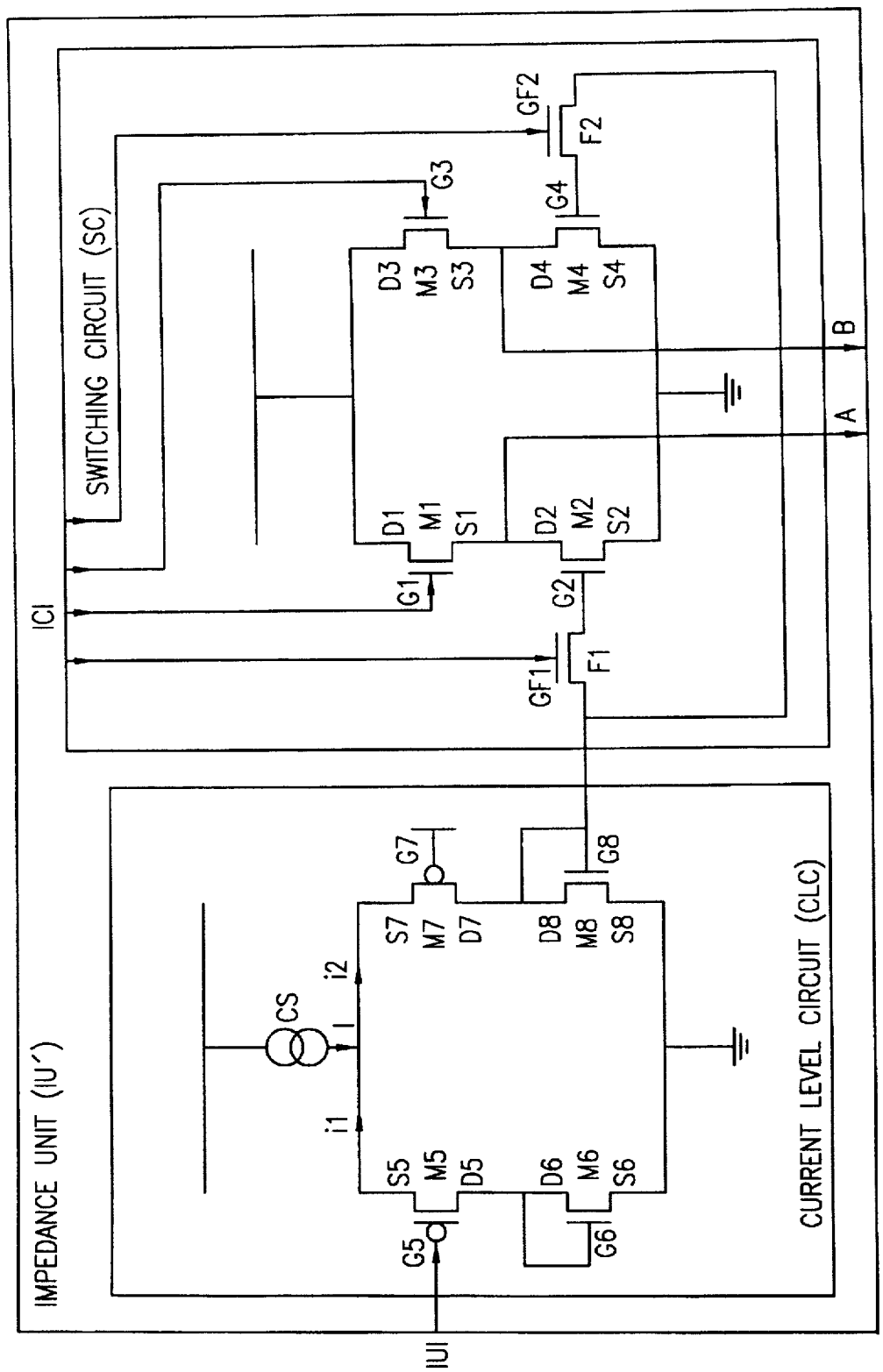
FIG. 4 is a detailed electronic schematic diagram of an embodiment of the impedance unit of FIG. 3.

Referring to FIG. 4, an electronic scheme of an impedance unit IU' as is included in the transmitter T' of FIG. 3 will be described and its working will be explained. As already mentioned, the particular impedance unit IU' of FIG. 4 is enabled to generate pulse shaped signals with a low level, a high level with a positive polarity and a high level with a negative polarity.

This impedance unit IU' therefore includes a current level circuit CLC and a switching circuit SC, the current level circuit CLC comprising a current source CS, two P-channel field effect transistors M5 and M7 with respective gates G5 and G7, drains D5 and D7, and sources S5 and S7, and two N-channel field effect transistors M6 and M8 with respective gates G6 and G8, drains D6 and D8, and sources S6 and S8, and the switching circuit SC comprising four N-channel field effect transistors M1, M2, M3, M4 with respective gates G1, G2, G3, G4, drains D1, D2, D3, D4, and sources S1, S2, S3, S4, and two additional N-channel field effect transistors F1 and F2 with respective gates GF1 and GF2.

An input IUI of the impedance unit IU' is also an input of the current level circuit CLC, an output of this current level circuit CLC is connected to an input of the switching circuit SC and the outputs of the switching circuit SC are coupled to the output terminals A and B.

A first N-channel field effect transistor M1 of the switching circuit SC is series connected to a second N-channel field effect transistor M2, with their junction point connected to the first output terminal A. In this junction point the source node S1 of transistor M1 and drain node D2 of transistor M2 are connected. A third N-channel field effect transistor M3 is similarly series connected to a fourth N-channel field effect transistor M4, with their junction point connected to the second output terminal B. In this junction point the source node S3 of transistor M3 and the drain node D4 of transistor M4 are connected. The series connection of the transistors M1 and M2 is parallel coupled to the series connection of the transistors M3 and M4 between a power supply line and the ground. The sources S2 and S4 of respective transistors M2 and M4 are therefore connected to the ground, while the drains D1 and D3 of respective transistors M1 and M3 are connected to the power supply line. Two additional N-channel field effect transistors F1 and F2 are connected between the gates G2 and G4 of respective transistors M2 and M4 and the input of the switching circuit SC.

The gates G1, G3, GF1 and GF2 of respective transistors M1, M3, F1 and F2 are all connected to an impedance control input bus ICI comprising a plurality of impedance control lines.

The current level circuit CLC includes a fifth P-channel field effect transistor M5, a sixth N-channel field effect transistor M6, a seventh P-channel field effect transistor M7 and an eighth N-channel field effect transistor M8.

The fifth P-channel field effect transistor M5 is series connected to the sixth N-channel field effect transistor M6, whose drain D6 and gate G6 are short circuited. In the junction point of these two transistors M5 and M6, the drains D5 and D6 are connected to each other. Furthermore, the seventh P-channel field effect transistor M7 is series connected to the eighth N-channel field effect transistor M8, the drain D8 and gate G8 of which are also short circuited in a point which is connected to the output of the current level circuit CLC. In the junction point of the transistors M7 and M8, the drains D7 and D8 are connected to each other. The source nodes S5 and S7 of respective transistors M5 and M7 are connected to the first terminal of the current source CS whose second terminal is connected to the power supply line. Additionally, the source nodes S6 and S8 of respective transistors M6 and M8 are connected to the ground, while the gate node G5 of transistor M5 is connected to the impedance unit input IUI. In this way, the current I provided by the current source CS is divided into a first current i1, flowing through the transistors M5 and M6, and a second current i2, flowing through the series connection of the transistors M7 and M8.

The impedance unit IU' works as follows: transistors M1 and F2 are switched off and transistors M3 and F1 are switched on when a pulse shaped output signal with the high level with negative polarity has to be transmitted. The output signal level will then be controlled by the voltage applied to the gate G2 of transistor M2 via transistor F1. Transistors M3 and F1 are switched off and transistors M1 and F2 are switched on when a pulse shaped output signal with the high level with positive polarity has to be transmitted. The output signal level will then be controlled by the voltage applied to the gate G4 of transistor M4 via transistor F2. Finally the transistors M1, M3, F1 and F2 are all switched off when no pulse signal has to be transmitted, which corresponds to the low level state, characterized by the decoupling of the transmitter T' from the transmission line TL.

During the time a high level with either a positive or negative polarity has to be transmitted, the level of the output signal is controlled by the voltage applied to the input of the switching circuit SC. This voltage is provided by the current level circuit CLC and is based on the level at the impedance unit input IUI.

Considering a rising voltage at the impedance unit input IUI, the current i1 will decrease because transistor M5 is a P-channel field effect transistor. As a result, the current i2 increases because both currents i1 and i2 are provided by the current source CS which applies a constant current I to the common point of the transistors M5 and M7. The transistors M8 and M2 in case of an output signal with a negative polarity, or the transistors M8 and M4 in case of an output signal with a positive polarity, constitute a current mirror. Still considering a rising voltage level at the impedance unit input IUI, the voltage level at the output of the current level circuit CLC will also rise and the output signal current applied to the load between the output terminals A and B will increase.

Summarizing, an increase of the voltage level at the impedance unit input IUI results in an increase of the output signal current. Opposite results will be caused in a similar way by a decrease of the voltage level at the impedance unit input IUI. The polarity of the output signal current on the contrary, is determined by the impedance control signals which control the switching of the transistors M1, M3, F1 and F2.

Figure 5:
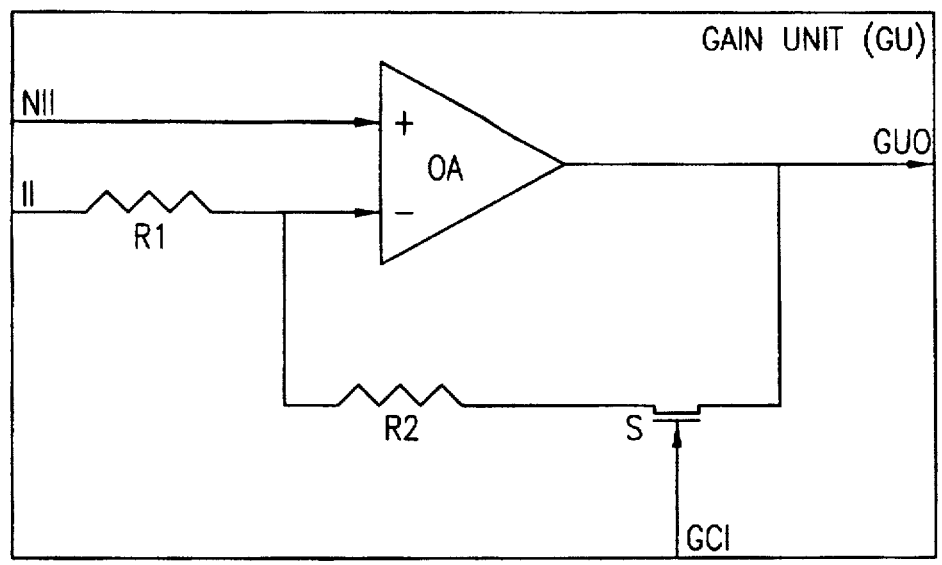
FIG. 5 is a detailed electronic schematic diagram of an embodiment of the gain unit of FIG. 3.

FIG. 5 shows an electronic scheme of a gain unit GU with a controllable gain, as is included in the transmitter T' of FIG. 3. This gain unit GU includes an operational amplifier OA, two resistors R1 and R2 and a switching transistor S.

A first input NII of the gain unit GU is connected to the non-inverting input of the operational amplifier OA, whilst a second input II of the gain unit GU is coupled to the inverting input of the operational amplifier OA via the first resistor R1. A series connection of the second resistor R2 and the switching transistor S is coupled between the inverting input of the operational amplifier OA and the output of the operational amplifier, which is also the output GUO of the gain unit GU. The gain control input GCI of the gain unit GU is connected to the gate node of the transistor S.

In normal working mode, transistor S is opened under the control of the gain control signal applied to the gain unit GU via the gain control input GCI. The operational amplifier OA, used as an integrator, then generates a differential signal if a difference exists between both signals applied to the first and second input, NII and II, respectively. Moreover, the operational amplifier OA provides the necessary gain and bandwidth.

To avoid clamping however, as already mentioned, the gain of the gain unit GU can be lowered. This gain reduction is performed in a second working mode wherein the switching transistor S is closed. The gain provided by the gain unit GU is then restricted to the proportion of the resistor R2 to the resistor R1. To have a reduced gain of 1/30 for example, the first resistor R1 should be chosen 30 times as large as the second resistor R2.

Figure 6:
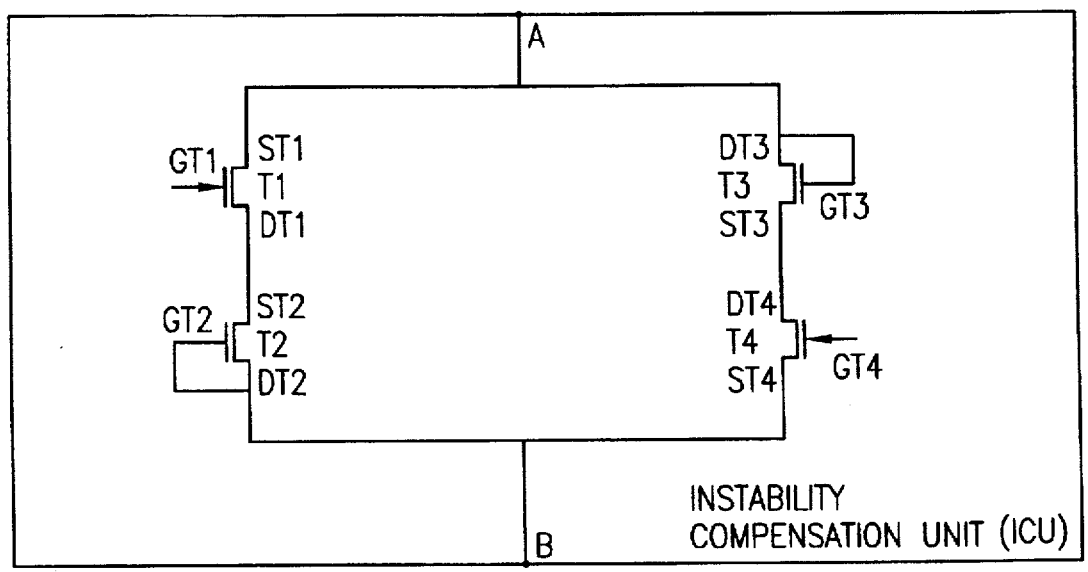
FIG. 6 is a detailed electronic schematic diagram of an embodiment of the instability compensation unit of FIG. 3.

Referring to FIG. 6, an electronic scheme of an instability compensation unit ICU as included in the particular transmitter T' of FIG. 3 is described.

The illustrated instability compensation unit ICU is adapted to enable transmission of pulse shaped output signals with a low level, a high level with a positive polarity and a high level with a negative polarity. This instability compensation unit ICU therefore includes two switching transistors T1 and T4, and two transistors which are used as resistors, T2 and T3.

A series connection of the switching field effect transistor T1 and the transistor used as resistor T2 is coupled between the terminals A and B of the instability compensation unit ICU. A second series connection of transistors T3 and T4 is also coupled between the terminals A and B in such a way that the drain DT3 of transistor T3 and the source ST1 of transistor T1 are connected to the terminal A, while the drain DT2 of transistor T2 and source ST4 of transistor T4 are connected to terminal B. The gate GT3 and drain DT3 of transistor T3, as well as the gate GT2 and drain DT2 of transistor T2 are short circuited.

Under the control of signals applied to the switching transistors T1 and T4, the instability compensation unit ICU can be transformed into either a resistor which allows current to flow from terminal A to terminal B, a resistor which allows current to flow from terminal B to terminal A or an open circuit between terminals A and B. If a current pulse with a positive polarity has to be transmitted, transistor T1 will be closed and transistor T4 will be opened to couple a parallel resistor T2 to the line impedance, allowing the current to flow from terminal A to terminal B.

If a current pulse with a negative polarity has to be transmitted, transistor T4 will be closed and transistor T1 will be opened to couple a parallel resistor T3 to the line impedance, allowing the current to flow from terminal B to terminal A.

Finally, if no current pulse has to be transmitted, both transistors T1 and T4 are opened to transform the instability compensation unit ICU into an open circuit. The resistor values of transistors T2 and T3 are chosen equal to each other and high enough to have a neglectible influence when coupled in parallel to a low load impedance, and low enough to decrease the global impedance sufficiently when connected in parallel to a high load impedance which may cause instability.

Figure 7:
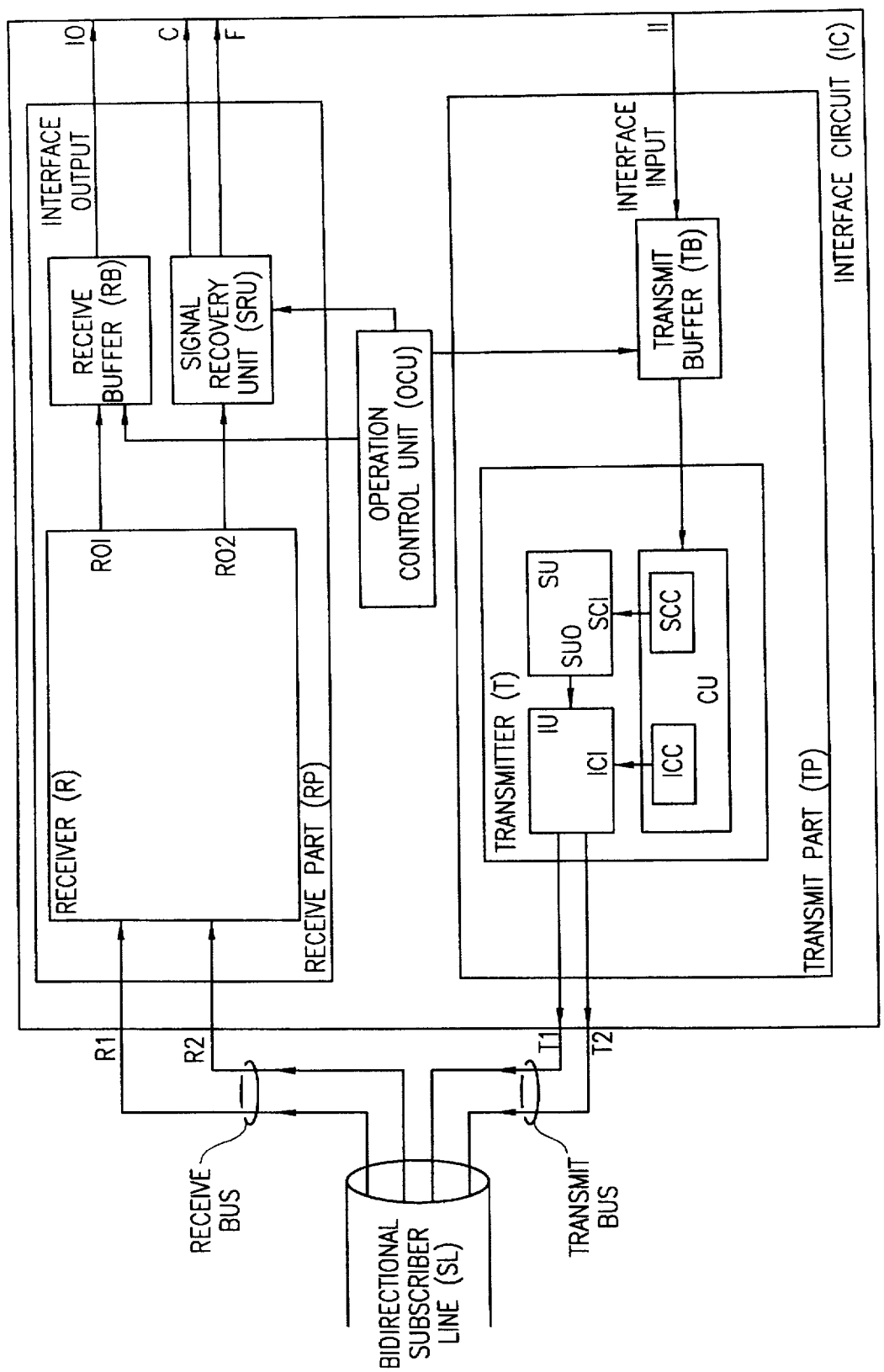
FIG. 7 is a schematic block diagram of an interface circuit according to the present invention.

Additionally, according to the present invention, an interface circuit IC as shown in FIG. 7 is disclosed. Such an interface circuit IC includes a receive part RP, a transmit part TP and an operation control unit OCU. The receive part RP comprises a receiver R, a receive buffer RB and a signal recovery unit SRU, while a transmitter T and a transmit buffer TB form part of the transmit part TP.

A receive bus R1, R2 is coupled to an interface output IO via the cascade of the receiver R and the receive buffer RB. In the opposite direction, an interface input II is coupled to a transmit bus T1, T2 by the cascade connection of the transmit buffer TB and the transmitter T. An input of the signal recovery unit SRU is connected to an output of the receiver R and the operation control unit OCU is coupled to the receive buffer RB, the transmit buffer TB and the signal recovery unit SRU. Both the receive bus R1, R2 and the transmit bus T1, T2 form part of a bidirectional subscriber line SL which couples the interface circuit IC to a second similar interface circuit.

The task of this interface circuit IC can be subdivided in receive functions and transmit functions. The receiver R receives data from the receive bus R1, R2 and applies these data to the receive buffer RB which temporarily stores the data before supplying them to the interface output IO. The received data are also applied to the signal recovery unit SRU to enable this signal recovery unit SRU to generate a bit clock signal at its first output C and a frame clock signal at its second output F.

Data to be transmitted by the interface circuit IC enter this interface circuit IC via its input II and are temporarily stored in the transmit buffer TB. A transmitter T, as already described above, transmits the data stored in the transmit buffer TB. The data therefore are applied to the control unit CU which includes an impedance control circuit ICC and a source control circuit SCC to control the impedance unit IU and source unit SU of the transmitter T respectively. Output signals of the impedance unit IU are applied to the transmit bus T1, T2 of the subscriber line SL.

The operation control unit OCU which forms part of the interface circuit IC controls both buffers RB and TB and the signal recovery unit SRU.

Figure 8:
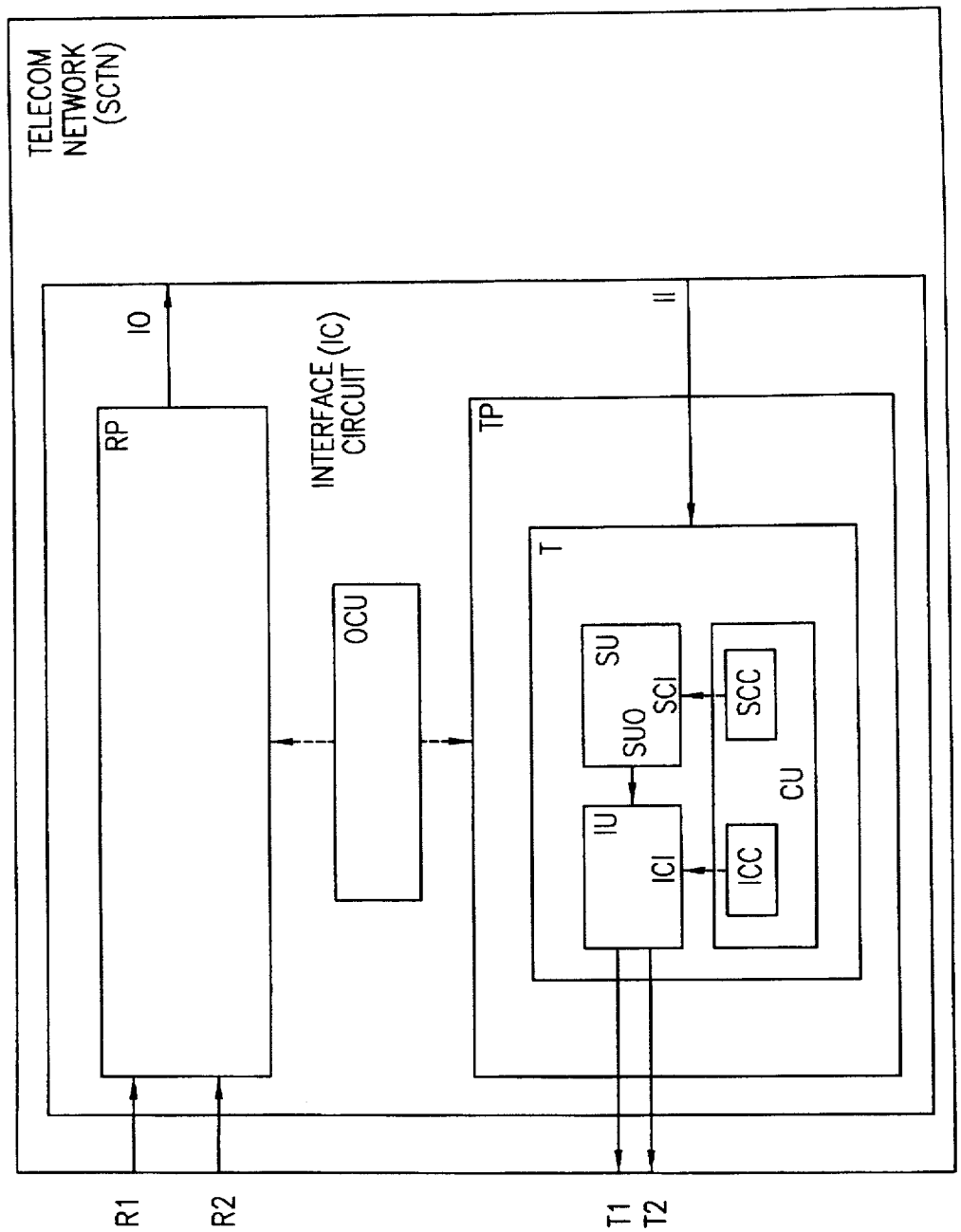
FIG. 8 is a schematic block diagram of a system component for a telecommunication network, according to the present invention.

An interface circuit IC as figured in FIG. 7 might be included in a system component for a telecommunication network SCTN as is shown in FIG. 8. This system component for a telecommunication network SCTN might for example be a network termination circuit which couples a subscriber terminal to a network exchange, a terminal adapter which couples a non ISDN subscriber to a network termination circuit or a subscriber terminal itself.

Figure 9:
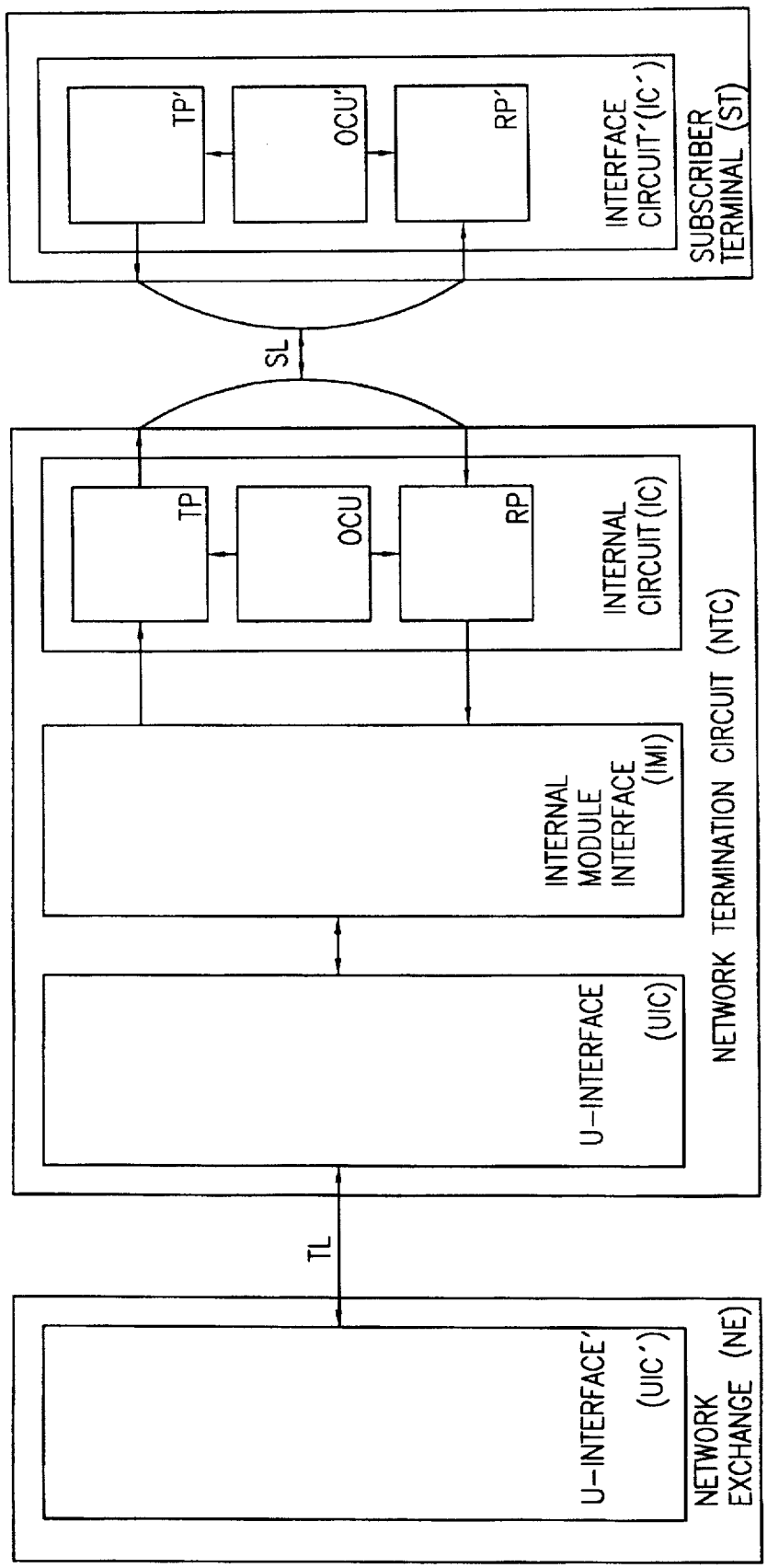
FIG. 9 is a schematic block diagram of a network termination circuit, which is a possible implementation of the system component for a telecommunication network of FIG. 8.

A network termination circuit NTC including such an interface circuit IC is shown in FIG. 9. The receive part RP and transmit part TP of the interface circuit IC are coupled to the transmit part TP' and receive part RP' of a similar interface circuit IC' in a subscriber terminal ST via the subscriber line SL.

The network termination circuit NTC further includes a U-interface circuit UIC which enables coupling the network termination circuit NTC to the network exchange NE via a telephone line TL. The U-interface circuit UIC and the interface circuit IC are coupled via an internal module interface IMI, which performs the conversion of data coding and bit rate.

Figure 10:
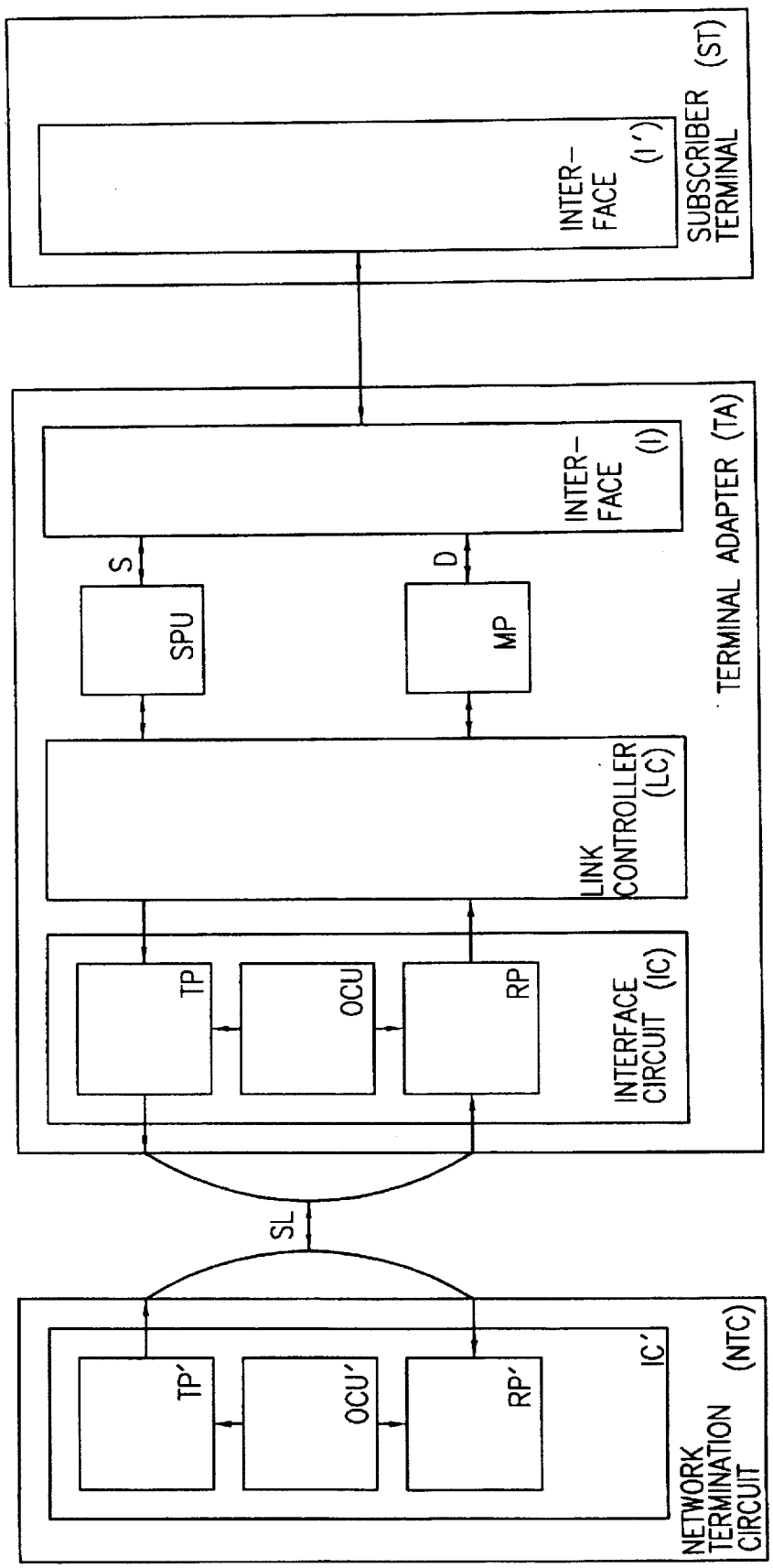
FIG. 10 is a block schematic block diagram of a terminal adapter, which is a possible implementation of the system component for a telecommunication network of FIG. 8.

A terminal adapter TA including such an interface circuit IC is shown in FIG. 10. This terminal adapter TA includes an interface I to receive and transmit data respectively from and to a non ISDN subscriber terminal ST which includes a similar interface I'. These data can be a combination of digital data D and analog signals S. A signal processing unit SPU converts the analog signals S to digital signals and vice versa, while a microprocessor MP performs the conversion of protocols for the digital data D. A link controller LC is finally included to multiplex or demultiplex signals and data and an interface circuit IC, as already described in detail, terminates the terminal adapter TA and enables the coupling of the terminal adapter TA to a network termination circuit NTC of the above described type.

Figure 11:
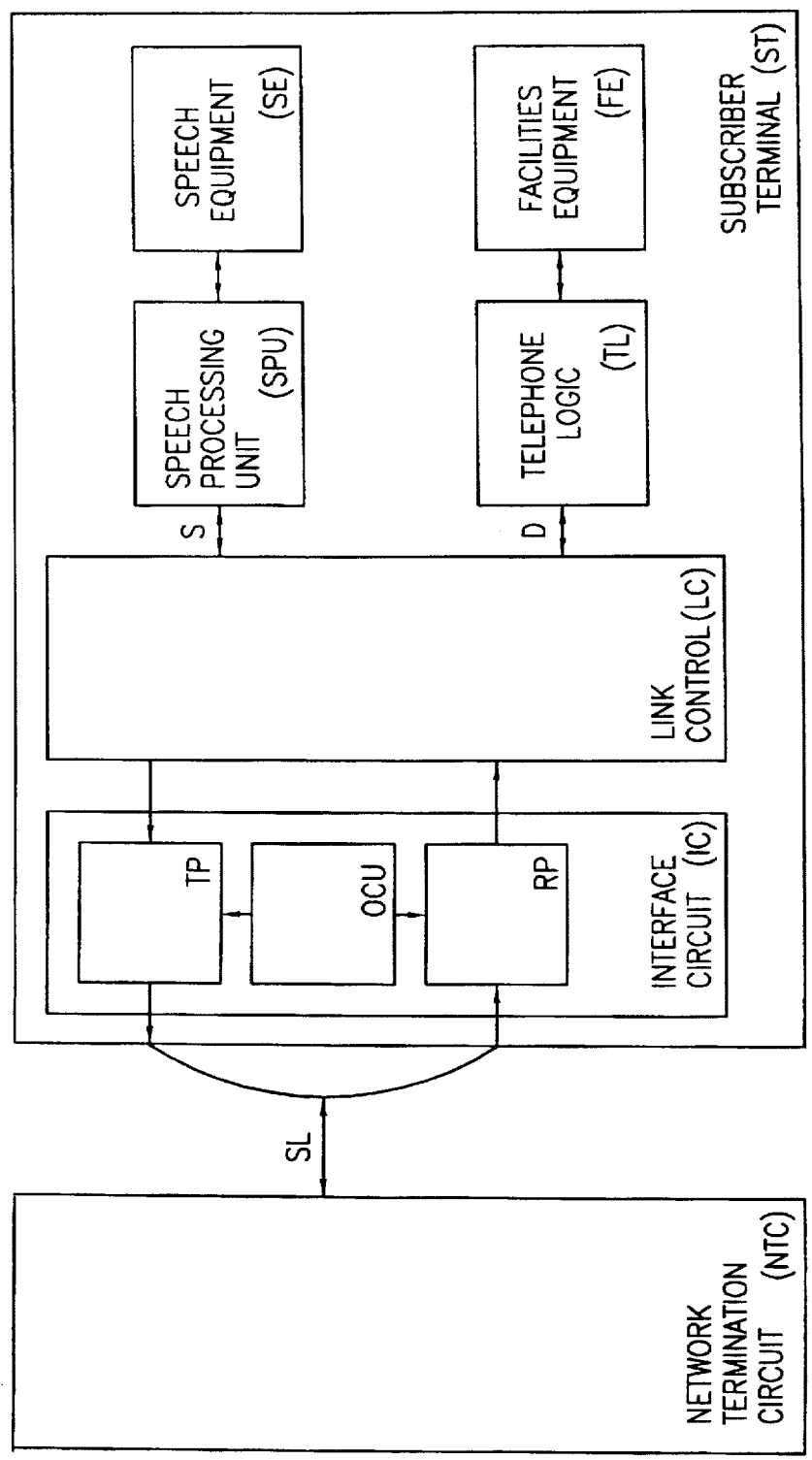
FIG. 11 is a block schematic block diagram of a subscriber terminal, which is also a possible implementation of the system component for a telecommunication network of FIG. 8.

Finally, a subscriber terminal ST including such an interface circuit IC is shown in FIG. 11.

The interface circuit IC provides the coupling of the subscriber terminal ST to a network termination circuit NTC for example. The subscriber terminal ST also includes a link controller LC to multiplex and demultiplex speech signals S and data D. The speech signals S are processed by a speech processing unit SPU which performs analog to digital conversion and vice versa, and digital filtering. Speech equipment SE as microphones, earphones and loudspeakers are connected to the speech processing unit SPU to establish communication with the subscriber. The data D are processed by telephone logic TL included in the subscriber terminal ST to take control of the facilities equipment FE, which may comprise e.g. a display or a push button set.

Summarizing, the transmitter according to the present invention can be adapted in different ways to be included in a wide variety of system components for telecommunication networks.

Simple modifications of the above described means which constitute the present transmitter, enable this transmitter to generate signals with possibly one, two or more high levels and a low level. Wherever a voltage level is used or generated it can be replaced by a current level and vice versa by simple modifications of the above described means.

While the principles of the invention have been described above in connection with specific apparatus, it is to be clearly understood that this description is made only by way of example and not as a limitation on the scope of the invention.

Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method for transmission of a signal with a low level and at least one high level, generated by a transmitter (T) and transmitted on a transmission line (TL) which couples said transmitter (T) to a receiver (R), wherein said transmitter (T) is decoupled from said transmission line (TL) during a time said signal is at said low level, and said transmitter (T) is coupled to said transmission line (TL) during a time said signal level is at said high level, characterized in that, to transit said signal from said high level to said low level, said transmitter (T) is decoupled from said transmission line (TL) only after said signal is decreased to said low level resulting in oscillations of said signal that are of decreased amplitude and that are restrictable within limits.

2. A method for transmission of a signal according to claim 1, wherein said low level is defined as a level below a threshold value, characterized in that, to transit said signal from a said high level to said low level, said transmitter (T)

is decoupled from said transmission line (TL) only after said signal level has reached said threshold value.

3. A transmitter (T), for providing a signal with a low level and at least one high level and for providing said signal to a transmission line (TL) for coupling said transmitter (T) to a receiver (R), said transmitter (T) including a source unit (SU) for providing a source level at a source unit output (SUO), an impedance unit (IU) having an impedance unit input coupled to said source unit output (SUO) and having an impedance unit output which is coupled to said transmission line (TL) for coupling and decoupling said source unit (SU) to and from said transmission line (TL) respectively, and a control unit (CU) including an impedance control circuit (ICC), provided for controlling said impedance unit (IU) so that during a time said signal is at said low level, said source unit (SU) is decoupled from said transmission line (TL) by said impedance unit (IU) and during a time said signal is at said high level, said source unit (SU) is coupled to said transmission line (TL) via said impedance unit (IU), characterized in that said control unit (CU) also includes a source control circuit (SCC), provided to control said source unit (SU) so that, to transit said signal from said high level to said low level, said source level is decreased during a decrease period after which said source unit (SU) is decoupled from said transmission line (TL).

4. A transmitter (T') according to claim 3, characterized in that said transmitter (T') also includes a feedback circuit (FC), coupled between said impedance unit output and said impedance unit input, and provided to apply said signal to said impedance unit (IU') for enabling feedback control of said signal during a time said signal is at said high level and for providing a smooth decrease of said signal during said decrease period.

5. A transmitter (T') according to claim 4, characterized in that said transmitter (T') further includes a gain unit having gain unit (GU) inputs coupled to said source unit output (SUO) and an output of said feedback circuit (FC) respectively, said gain unit having a gain unit output coupled to said impedance unit input for providing a differential signal, said gain unit (GU) for comparing said source level and a level of said signal and for providing a selected gain and bandwidth for controlling said level of said signal.

6. A transmitter (T') according to claim 5, characterized in that said control unit (CU') includes a gain control circuit (GCC) for decreasing said selected gain during a time said source unit is decoupled from said transmission line (TL), thereby avoiding clamping at said gain unit output.

7. A transmitter (T') according to claim 3, characterized in that said source unit (SU') includes a source selection circuit (SSC) for control by said source control circuit (SCC) for decreasing said source level by providing a second source level instead of a first source level to said impedance unit (IU').

8. A transmitter (T') according to claim 3, characterized in that said transmitter (T') further includes an instability compensation unit (ICU), connected between a first (A) and a second (B) output terminal of said impedance unit output for enabling said transmitter (T') to drive different loads without instability risks.

\* \* \* \* \*